United States Patent
Ali et al.

(10) Patent No.: US 8,006,073 B1
(45) Date of Patent: Aug. 23, 2011

(54) SIMULTANEOUS SPECULATIVE THREADING LIGHT MODE

(75) Inventors: Abid Ali, Santa Clara, CA (US); Shailender Chaudhry, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 567 days.

(21) Appl. No.: 11/864,427

(22) Filed: Sep. 28, 2007

(51) Int. Cl.
   *G06F 15/78* (2006.01)
(52) U.S. Cl. .................................................. 712/220
(58) Field of Classification Search .................. None
   See application file for complete search history.

(56) References Cited

U.S. PATENT DOCUMENTS

| | | | |
|---|---|---|---|
| 6,907,520 B2 | 6/2005 | Parady | |
| 7,185,178 B1 | 2/2007 | Barreh et al. | |
| 2005/0138328 A1* | 6/2005 | Moy et al. | 712/205 |
| 2005/0251648 A1* | 11/2005 | Yamazaki | 712/20 |
| 2006/0004995 A1 | 1/2006 | Hetherington et al. | |
| 2006/0101238 A1* | 5/2006 | Bose et al. | 712/206 |
| 2006/0179274 A1* | 8/2006 | Jones et al. | 712/205 |

OTHER PUBLICATIONS

U.S. Appl. No. 61/052,536, filed May 12, 2008.

* cited by examiner

*Primary Examiner* — Eddie Chan
*Assistant Examiner* — John Lindlof
(74) *Attorney, Agent, or Firm* — Rory D. Rankin; Meyertons, Hood, Kivlin, Kowert & Goetzel, P.C.

(57) ABSTRACT

A system and method for management of resource allocation of threads for efficient execution of instructions. Prior to dispatching decoded instructions of a first thread from the instruction fetch unit to a buffer within a scheduler, logic within the instruction fetch unit may determine the buffer is already full of dispatched instructions. However, the logic may also determine that a buffer for a second thread within the core or micro core is available. The second buffer may receive and issue decoded instructions for the first thread until the buffer is becomes unavailable. While the second buffer receives and issues instructions for the first thread, the throughput of the system for the first thread may increase due to a reduction in wait cycles.

17 Claims, 5 Drawing Sheets

SIMULTANEOUS SPECULATIVE THREADING LIGHT MODE

BACKGROUND OF THE INVENTION

1. Field of the Invention

This invention relates to microprocessors, and more particularly, to the management of resource allocation of threads for efficient execution of instructions.

2. Description of the Relevant Art

Modern processor cores, or processors, are pipelined in order to increase throughput of instructions per clock cycle. However, the throughput may still be reduced due to certain events. One event is a stall, which may be caused by a branch misprediction, a cache miss, data dependency, or other, wherein no useful work may be performed for a particular instruction during a clock cycle. Another event may be that resources, such as circuitry for an arithmetic logic unit (ALU) or for a load-store unit (LSU), may not be used for one or more clock cycles due to the type of instruction(s) being executed in a particular clock cycle.

Different techniques are used to fill these unproductive cycles in a pipeline with useful work. Some examples include loop unrolling of instructions by a compiler, branch prediction mechanisms within a core and out-of-order execution within a core. An operating system may divide a software application into processes and further divide processes into threads. A thread, or strand, is a sequence of instructions that may share memory and other resources with other threads and may execute in parallel with other threads. A processor core may be constructed to execute more than one thread per clock cycle in order to increase efficient use of the hardware resources and reduce the effect of stalls on overall throughput. A microprocessor may include multiple processor cores to further increase parallel execution of multiple instructions per clock cycle.

However, an operating system (O.S.) may place a thread, or strand, in a parked state. A parked state is an idle state for the strand where no instructions for that particular strand are assigned to the hardware resources of the strand. This may occur when there is insufficient work and the strand enters an idle loop in the kernel. Within a core of multiple strands, any shared resources among strands are now only used by the strands that are not parked. The only time the shared resources are completely idle are when all the strands within the core are parked.

A problem may arise with resource management within a core when one or more strands are parked. The instruction fetch and dispatch mechanisms may not be able to sustain a good instruction stream rate and hence later stages of the pipeline will have no or limited set of instructions to work on. Therefore, the throughput, or instructions per clock cycle (IPC), may not be high as it can be. This may be due to the complexity and latency of the fetch and dispatch mechanisms. If a microprocessor is designed to execute many strands by incorporating multiple cores, there may be larger fetch latencies due to circuit constraints, such as routing distances and added stages of logic. A core with parked strands and an active strand may not have all of its resources efficiently used by the active strand. The active strand may not receive a steady sufficient supply of instructions due to the above reasons. Also, a multi-cycle latency between fetches for a particular active strand may be uncovered as no useful work will be performed by the core as the other strands are parked.

In view of the above, an efficient method for the management of resource allocation of threads for efficient execution of instructions is desired.

SUMMARY OF THE INVENTION

Systems and methods for management of resource allocation of threads for efficient execution of instructions are disclosed. In one embodiment, a system includes a memory that stores instructions of an application. An operating system may divide the application into processes and threads. Each instruction in the memory may be assigned to a thread. An instruction fetch unit may fetch multiple instructions per clock cycle from the memory. The instructions are later decoded. A scheduler that may determine out-of-order issue of instructions to an execution unit which may comprise a buffer for each thread within a core or micro core. Prior to dispatching the instructions of a first thread from the instruction fetch unit to a buffer within the scheduler, logic within the instruction fetch unit may determine the buffer is already full of dispatched instructions. However, the logic may also determine that a buffer for a second thread within the same core or micro core is available. This second buffer may be available due to its corresponding thread is placed in a parked state by the operating system. Also, depending on the embodiment, the buffer may be empty or not full of dispatched instructions.

The instructions from the fetch unit may be dispatched to the second buffer in the scheduler. The second buffer may continue to receive instructions for the first thread until the buffer is full or the second thread is moved from a parked state to an active state by the operating system. While the second buffer receives and issues instructions for the first thread, the throughput of the system for the first thread may increase. This increase may be due to a reduction in wait cycles the first buffer may experience between the time the first buffer becomes full and the time more instructions are dispatched to available entries in the first buffer.

Figure 1:
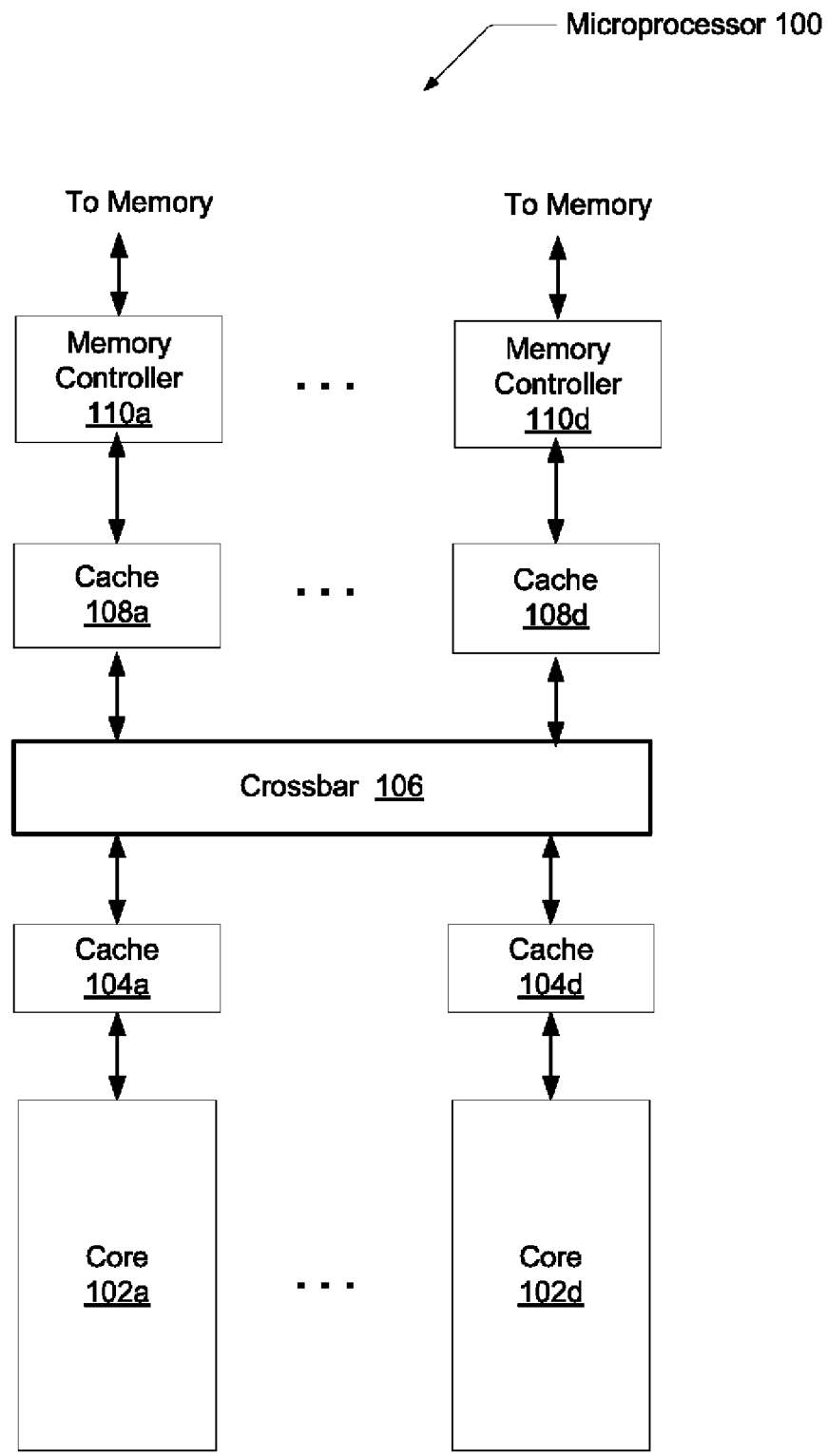
FIG. 1 is a generalized block diagram illustrating one embodiment of a microprocessor.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Referring to FIG. 1, one embodiment of a microprocessor 100 is shown. Microprocessor 100 may have multiple cores 102*a*-102*d*. As used herein, elements referred to by a reference numeral followed by a letter may be collectively referred to by the numeral alone. For example, cores 102*a*-102*d* may be collectively referred to as cores 102. Each core 102 may include a superscalar microarchitecture with one or more multi-stage pipelines. Also, each core 102 may be designed to execute multiple strands. Each core 102 may comprise a first-level cache or in other embodiments, the first-level cache 104 may be outside the core 102.

A crossbar 106 may be used to connect each core 102 and first-level cache 104 to shared resources such as second-level caches 108 and lower-level memory via memory controllers 110. Interfaces between crossbar 106 and the different levels of caches 104 and 108 may comprise any suitable technology. In other embodiments, other levels of caches may be present between cache 108 and memory controller 110. Also, an I/O bus adapter, not shown, may be coupled to crossbar 106 to provide an interface for I/O devices to caches 104 and 108 and cores 102. In another embodiment, an I/O interface may be implemented in memory controller 110. Memory controllers 110 may be coupled to lower-level memory, which may include other levels of cache on the die outside the microprocessor, dynamic random access memory (DRAM), dual in-line memory modules (dimms) in order to bank the DRAM, a hard disk, or a combination of these alternatives. Also, in other embodiments, there may only be a single memory controller 110 on microprocessor 100.

Figure 2:
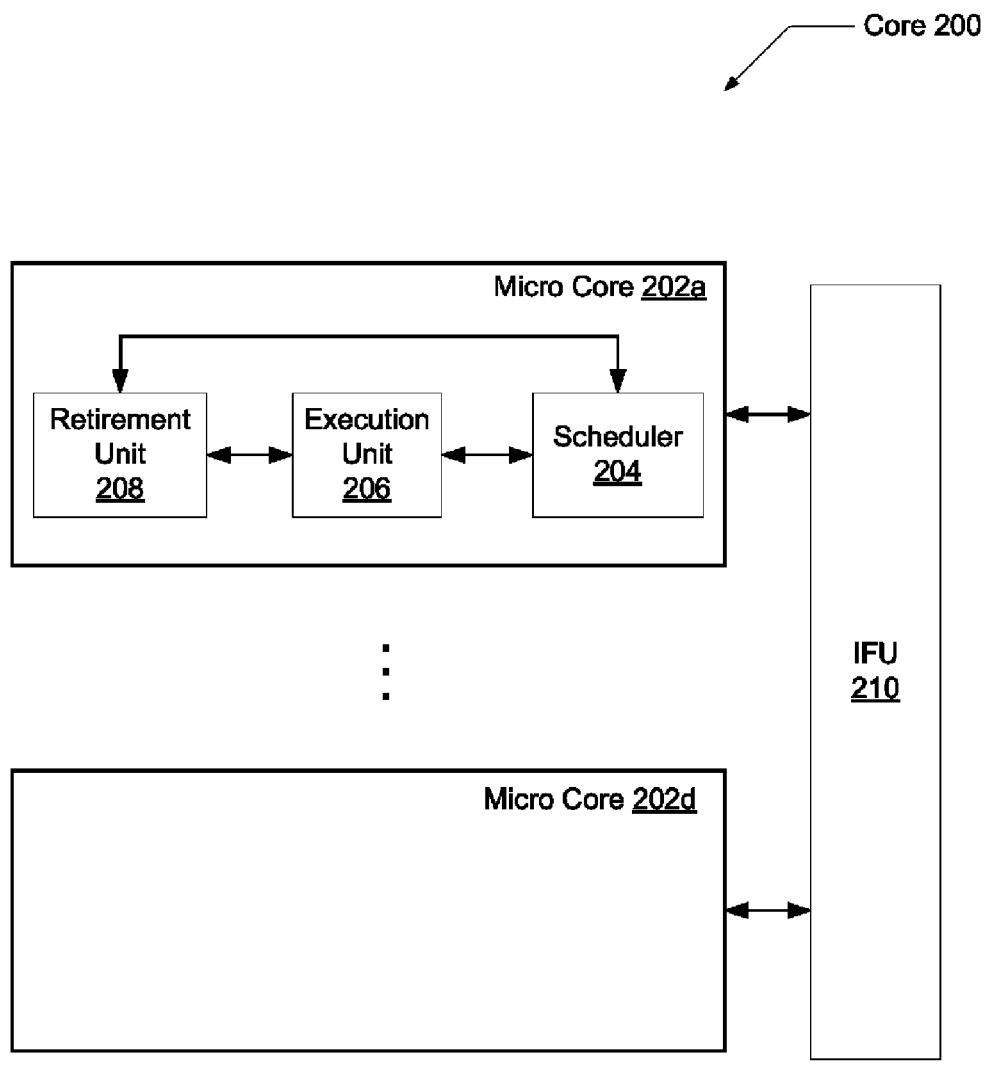
FIG. 2 is a generalized block diagram illustrating one embodiment of a processor core.

FIG. 2 illustrates one embodiment of a processor core 200 within a microprocessor 100. Each core 200 may comprise multiple micro cores 202. In one embodiment, each micro core 202 may be able to execute 2 strands simultaneously. In other embodiments, each micro core 202 may be able to execute one, four, or another number of strands simultaneously. Each micro core 202 may include a superscalar microarchitecture with a multi-stage pipeline as well as perform out-of-order execution of the instructions. Also, each micro core 202 may be configured to execute instructions for 2 strands. In other embodiments, each micro core 202 may execute instructions for another number of strands.

In one embodiment, an instruction fetch unit (IFU) 210 fetches instructions from memory, which may include a first-level instruction-cache (i-cache) and a corresponding instruction translation-lookaside-buffer (i-TLB). The i-cache and i-TLB may be placed within processor core 200 or in other embodiments, they may be placed outside the core 200. The instruction i-cache and i-TLB may store instructions and addresses respectively in order to access the instructions for a software application. In one embodiment, the IFU 210 may fetch multiple instructions from the i-cache per clock cycle if there are no i-cache or i-TLB misses.

The IFU 210 may include a program counter that holds a pointer to an address of a memory line containing the next instruction(s) to fetch from the i-cache. This address may be compared to addresses in the i-TLB. The IFU 210 may also include a branch prediction unit to predict an outcome of a conditional instruction prior to an execution unit determining the actual outcome in a later pipeline stage. Logic to calculate a branch target address may also be included in IFU 210. The IFU 210 may need to fetch instructions for multiple strands. For example, there may be 4 micro cores 202 and each micro core 202 may be capable of executing 2 strands simultaneously. Therefore, the IFU 210 may need to monitor the instruction fetch requirements of 8 different strands.

Each micro core 202 may comprise a pipeline that includes a scheduler 204, an execution unit 206, and a retirement unit 208. For purposes of discussion, the functionality and placement of blocks in this embodiment are shown in a certain manner. However, some functionality or logic may occur in a different block than shown. Additionally, some blocks may be combined or further divided in another embodiment. For example, a decoder unit may be included in the IFU 210 or in the scheduler 204. The decoder unit decodes the opcodes of the one or more fetched instructions per clock cycle. In one embodiment, the instructions may be pre-decoded prior to arriving to the decoder 204. The instructions may be stored in the i-cache in the pre-decoded format or the instructions may be pre-decoded in the IFU 210.

After decoding, both data and control signals for the instruction may be sent to a buffer within the scheduler 204 of the appropriate strand. Scheduler 204 may allocate multiple entries per clock cycle in a reorder buffer included in the retirement unit 208. In another embodiment, the decoder unit may perform this allocation. The reorder buffer may be configured to ensure in-program-order retirement of instructions. The scheduler 204 may include circuitry referred to as reservation stations where instructions are stored for later issue and register renaming may occur. The allocation of entries in the reservation stations is considered dispatch. Scheduler 204 may retrieve source operands of an instruction from a register file or a reorder buffer included in the retirement unit 208. Also, the source operands may be retrieved from the result buffers or buses within the execution unit 206. The scheduler 204 may issue instructions to the execution unit 206 when the source operands of the instruction are ready and an available function unit is ready within the execution unit 206 to operate on the instruction. The scheduler 204 may issue multiple instructions per clock cycle and may issue the instructions out-of-program-order.

These instructions may be issued to integer and floating-point arithmetic functional units, a load/store unit, or other within the execution unit 206. The functional units may include arithmetic logic units (ALU's) for computational calculations such as addition, subtraction, multiplication, division, and square root. Logic may be included to determine an outcome of a flow control conditional instruction. The load/store unit may include queues and logic to execute a memory access instruction.

Results from the functional units and the load/store unit within the execution unit 206 may be presented on a common data bus in order to retire instructions and to bypass data to dependent instructions. The results may be sent to the reorder buffer in the retirement unit 208. In one embodiment, the reorder buffer may be implemented as a first-in first-out (FIFO) queue that ensures in-order retirement of instructions according to program order. Here, an instruction that receives its results is marked for retirement. If the instruction is head-of-the-queue, it may have its results sent to a register file within the retirement unit 208. The register file may hold the architectural state of the general-purpose registers (GPRs) of the micro core 202.

Figure 3:
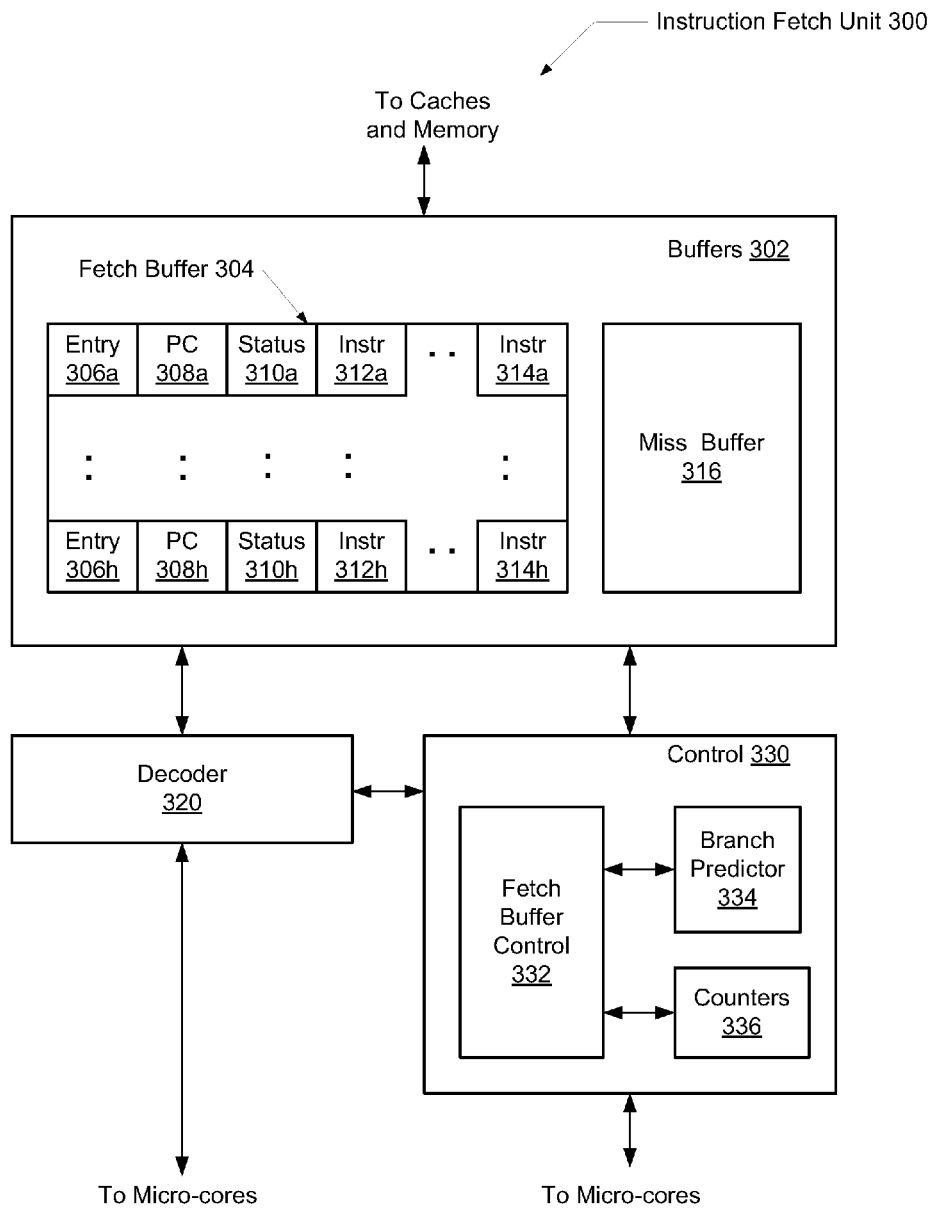
FIG. 3 is a generalized block diagram illustrating another embodiment of an instruction fetch unit.

Referring now to FIG. 3, one embodiment of an instruction fetch unit (IFU) 300 is shown. A set of buffers 302 may be included in the IFU 300. The set 302 may include a Fetch Buffer 304 and a Miss Buffer 316. The Fetch Buffer 304 may be used to store memory access requests for a strand within a particular micro core and the accompanying data of a memory line when it arrives from memory. In alternative embodiments, each strand of a particular micro core may have its own buffer, rather than combine the memory requests of multiple strands. In one embodiment, each entry of the fetch buffer 304 may have an entry number 306, and the address of the memory request, or the program counter 308. Status information 310 may include a valid bit, the strand number, a bit to signify the request is still waiting on hit or miss information, and other status information. One or more instructions, 312 and 314, returned from a memory on a cache hit may be included.

The Miss Buffer 316 may be used to store memory requests that missed the first-level cache. Once the miss data returns (e.g., from a second level cache), the data may be forwarded to Fetch Buffer 304 and also written into the instruction cache for future use. In one embodiment, the Miss Buffer 316 may be a separate buffer from the Fetch Buffer 304 for a variety of reasons, including different functional needs or circuit constraints. In one embodiment, Fetch Buffer 304 stores cache lines being read from the instruction cache and/or data returning from a second level cache(s). In one embodiment, each entry of the Miss Buffer 316 may contain information pertaining to strand identifiers, virtual addresses, and other status attributes. This information may include additional bits to identify which level of memory is currently being accessed and whether the entry is still waiting for hit or miss information regarding that level of memory.

As mentioned above, a decoder 320 may be included in the IFU 210 or in the scheduler 204. The decoder 320 decodes the opcodes of the one or more fetched instructions per clock cycle. In one embodiment, the instructions may be pre-decoded prior to arriving to the decoder 320. In one embodiment, a control block 330 in the IFU 300 may include a branch predictor 334 to predict an outcome of a conditional instruction prior to an execution unit determining the actual outcome in a later pipeline stage. Logic to calculate a branch target address may also be included.

In one embodiment, a fetch buffer control 332 may be used to monitor the memory access requests on a per strand basis. The control logic within the fetch buffer control 332 may use counters 336 to monitor and maintain the number of allowable memory requests, or credits, each strand possesses at a give time. Also, the decoder 320 may be configured to dispatch a maximum number of instructions per clock cycle, such as 4 instructions, to the scheduler. For example, the Fetch Buffer 304 may receive 16 instructions per fetched memory line. A scheduler in each micro core may have a buffer per strand that may only store 8 instructions. The decoder 320 may completely fill a buffer in a scheduler in 2 clock cycles if a particular strand is chosen by the fetch buffer control 332 to receive instructions in 2 consecutive clock cycles. The fetch buffer control 332 may use counters 336 to monitor how many instructions each buffer may receive on a per strand basis. A counter within the counters 336 for a particular strand may decrement by the number of instructions dispatched for that strand. The same counter may increment when the fetch buffer control 332 receives signals from a micro core that the scheduler issued instructions from the buffer to a function unit within an execution unit. The counter will increment by the same amount as the number of instructions issued from the scheduler's buffer.

The latencies for dispatching decoded instructions from the IFU to a scheduler within a micro core may not be small. For example, referring to FIG. 2 again, if an IFU is configured to dispatch instructions to 4 micro cores wherein each micro core executes instructions for 2 strands, the IFU needs counters and logic to monitor 8 strands. The routing delays and stages of logic may require multiple clock cycles. Therefore, if a particular strand receives 4 instructions in 2 consecutive clock cycles to fill its schedule buffer of 8 entries, this strand may need to wait a number of clock cycles before it receives more instructions. Although the first set of 4 instructions may be issued by the scheduler as it receives the subsequent dispatched 4 instructions, the counters in the IFU are not updated as quickly.

If another strand within the same micro core is in a parked state, the microprocessor may be able to use the resources of this other strand in order to increase the IPC of another strand. Again, a parked state may comprise a state for the strand where no instructions for that particular strand are assigned to the hardware resources of the strand. This may occur, for example, when there is insufficient work and the strand enters an idle loop in the kernel. Normally, when a strand enters a parked state, shared resources such as function units in an execution unit are still used by the active strand. In fact, now more function units may be available for the active strand. This may help maintain the maximum number of instructions to be issued per clock cycle. However, even if the microprocessor is able to issue 4 instructions per clock cycle due to available function units, the IPC is still 1.6. In order to increase the IPC, the buffer resources within the scheduler of another strand (e.g., a parked strand) may be used. If this is possible, some latency may be removed. Using such an approach, the IPC may be increased.

Figure 4:
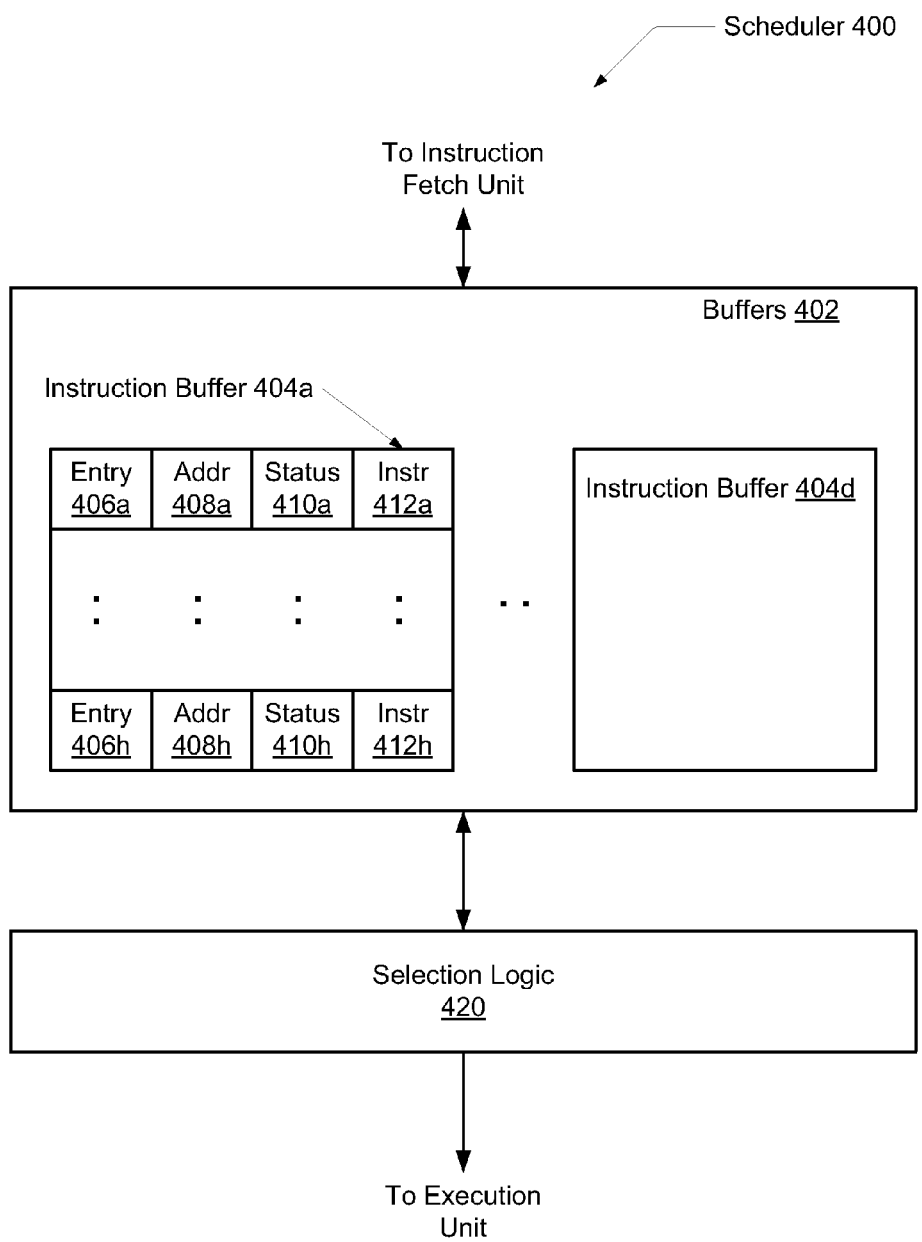
FIG. 4 is a generalized block diagram illustrating one embodiment of a scheduler.

Turning now to FIG. 4, one embodiment of a scheduler 400 is illustrated. Scheduler 400 may include buffers 402 and selection logic 420. In one embodiment, the buffers 402 may include one instruction buffer 404 per strand. Each instruction buffer 404 may be configured to receive multiple instructions per clock cycle from the IFU. However, in one embodiment, only one instruction buffer 404 receives instructions per clock cycle. Also, each instruction buffer 404 may be configured to send multiple instructions per clock cycle to the execution unit. In one embodiment, only one instruction buffer 404 sends instructions per clock cycle.

The scheduler 400 may send information to the IFU regarding the number of instructions sent in a clock cycle to the execution unit. The information may come from the buffers 402 or from the selection logic 420. Each entry of an instruction buffer 404 may include an entry number 406, and the address of the instruction 408. Status information 410 may include a valid bit, the strand number, a bit to denote whether or not the instruction has been dispatched, a bit to denote whether or not the operands have completed register renaming, a bit for each source operand to denote if the operand is available, and other status information. The instruction 412 itself with operands and control signals may be stored in the entry also.

Selection logic 420 may determine which instruction buffer 404 is able to issue instructions in a particular clock cycle to the execution unit and the number of instructions that may be issued. The determination may depend on the available function units in the execution unit, the number of instructions stored in each instruction buffer 404, the availability of operands for the stored instructions, and other requirements that depend on the embodiment chosen for the design.

As discussed above, the buffer resources of a another strand, such as an instruction buffer 404 in the scheduler 400, may be used for an active strand in order to increase the IPC of the microprocessor. For example, if strand 0 is an active strand and strand 1 is in a parked state, the instruction buffer 404 for strand 1 may be used to store dispatched instructions for strand 0. In such a case, the selection logic 420 may mark the issued instructions from stand 1's instruction buffer 404 as strand 0 issued instructions, rather than as strand 1 issued instructions. In one embodiment, a multiplexer may be used to perform this marking of the instructions. Also, state machines may be included in the fetch buffer control 332 to alternate between a separated state and a combined state. The instruction buffers 404 may only receive and issue instructions of their respective strand during the separates state. An instruction buffer 404 of a parked strand may receive and issue instructions of an active strand during the combined state. Table 1 displays one embodiment of a state machine for alternating between a separate state and a combined state for 2 strands. The output signal, SST-Lite Mode, denotes a simultaneous speculative threading lite mode used to transition the state machine to the combined state.

TABLE 1

IFU State Machine for SST-Lite Mode Control

| State | | Input | | Output |
|---|---|---|---|---|
| Present State | Next State | Strand 0 Empty | Strand 1 Parked | SST-Lite Mode |
| Separate | Separate | X | 0 | 0 |
| Separate | Separate | 0 | 1 | 0 |
| Separate | Combined | 1 | 1 | 1 |
| Combined | Combined | X | 1 | 1 |
| Combined | Combined | 0 | 0 | 1 |
| Combined | Separate | 1 | 0 | 0 |

When the state machine within the IFU is in the combined state, control logic may determine which instruction buffer 404 should receive dispatched instructions from the IFU in a particular clock cycle. Table 2 displays one embodiment of a state machine in the IFU to steer the dispatched instructions to the proper instruction buffer. In Table 2 below, "Strand 0 Credits Empty" in column three represents the state of credits on the Instruction Fetch Unit, so if "Strand 0 credits empty"=0 and "Strand 0 credits Full"=1, that means Strand 0 dedicated buffer in the Scheduler is empty.

TABLE 2

IFU State Machine for Instruction Buffer Usage in SSTL Mode.

| State | | Input | | | | Output |
|---|---|---|---|---|---|---|
| Present State | Next State | Strand 0 Credits Empty | Strand 0 Credits Full | Strand 1 Credits Empty | Strand 1 Credits Full | Index Pointer |
| SSTL S0 Buffer | SSTL S0 Buffer | 0 | 1 | 0 | 1 | 0 |
| SSTL S0 Buffer | SSTL S0 Buffer | 0 | 0 | 0 | 1 | 0 |
| SSTL S0 Buffer | SSTL S1 Buffer | 1 | 0 | 0 | 1 | 1 |
| SSTL S1 Buffer | SSTL S1 Buffer | 1 | 0 | 0 | 0 | 1 |
| SSTL S1 Buffer | SSTL S1 Buffer | 1 | 0 | 1 | 0* | 1 |
| SSTL S1 Buffer | SSTL S1 Buffer | 0+ | 0 | 1 | 0 | 1 |
| SSTL S1 Buffer | SSTL S0 Buffer | 0 | 1 | 1 | 0 | 0 |
| SSTL S0 Buffer | SSTL S0 Buffer | 0 | 1 | 0 | 1 | 0 |

Figure 5:
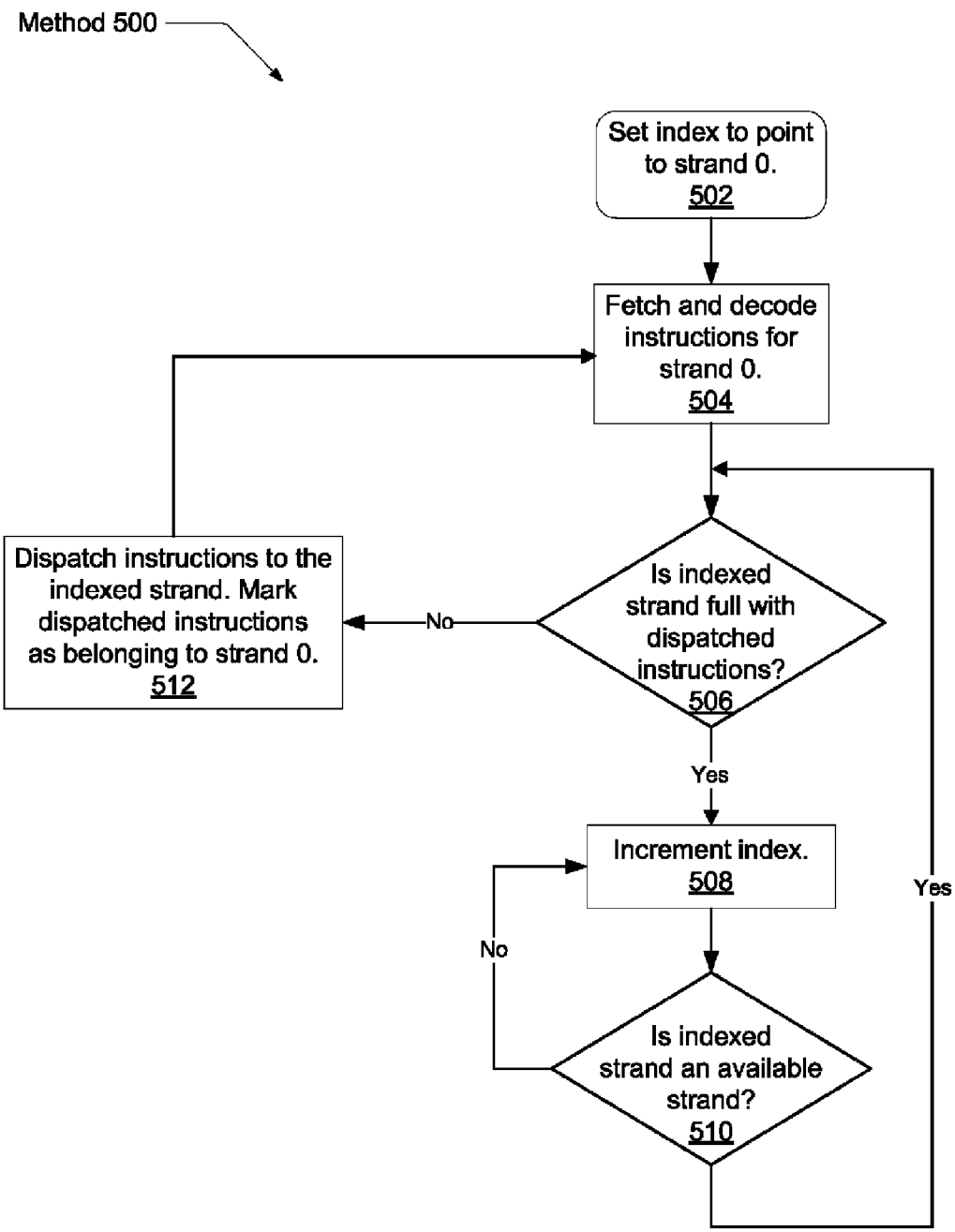
FIG. 5 is a flow diagram of one embodiment of a method for efficient management of resource allocation of threads.

*In one embodiment Strand 0 Credit Full will go to 1 before Strand 1 Credit Full can go high, where on the Scheduler's side buffer's are read in a round robin fashion
+Credit replenishment is occurring for Strand 0, hence no longer Strand 0 is empty Referring to FIG. 5, a method 500 of one embodiment for the management of resource allocation of threads for efficient execution of instructions is shown. For purposes of discussion, the steps in this embodiment are shown in sequential order. However, some steps may occur in a different order than shown, some steps may be performed concurrently, some steps may be combined with other steps, and some steps may be absent in another embodiment. An index pointer within the IFU is set to point to active strand 0 in block 502. Strand 0 is chosen for illustrative purposes only. In alternative embodiments, another active strand may be chosen. Also in alternative embodiments, the index pointer may be placed in the scheduler. The index pointer is used to determine which instruction buffer within the scheduler will receive decoded instructions.

Instructions are fetched and decoded for strand 0 in block 504. Instructions may be fetched and decoded for other active strands in other clock cycles. If the instruction buffer indexed by the index pointer is full of dispatched instructions (decision block 506), then a search may be needed to find any other available instruction buffers to store the decoded instructions. In one embodiment, the search may begin by incrementing the index pointer in block 508. If the new indexed instruction buffer is available (decision block 510), then flow for method 500 returns to decision block 506. An instruction buffer may be determined to be available if its corresponding strand is in a parked state and the instruction buffer is empty. In alternative embodiments, an instruction buffer may be determined to be available if its corresponding strand is in a parked state and the instruction buffer is not full. This embodiment may require more complex control circuitry. Further, in alternative embodiments, other strands other than strand 0 may need another buffer to receive decoded instructions in order to increase its corresponding throughput. A condition may arise where two strands search and find the same buffer of an available strand. In this case, a priority scheme is needed in the logic. Strand 0 may be given higher priority due to a round-robin scheme, its application had begun first, control logic determined its application is more critical, or another method may be used. In such a case, strand 0 may be granted use of the available buffer and the other strand needs to continue its search.

If an instruction buffer indexed by the index pointer is not full of dispatched instructions (decision block 506), then the decoded instructions may be dispatched to the instruction buffer in block 512. If the instruction buffer does not correspond to strand 0, the instructions need to be marked as belonging to strand 0.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a scheduler comprising a first buffer including a first plurality of entries allocated for use by a first thread and a second buffer including a second plurality of entries allocated for use by a second thread;
   an execution unit; and
   an instruction fetch unit, wherein the instruction fetch unit is configured to:
   identify a state associated with buffers in the scheduler;
   dispatch decoded instructions of the first thread to the first buffer, in response to detecting the state indicates a non-combined state; and
   temporarily dispatch decoded instructions of the first thread to the second buffer as long as the first thread is assigned by an operating system to receive instructions and the state indicates a combined state, wherein the state indicates the combined state responsive to detecting:
   there is no available entry of the first plurality of entries in the first buffer;
   there is an available entry of the second plurality of entries in the second buffer; and the second thread is not assigned by an operating system to receive instructions.

2. The system as recited in claim 1, wherein in response to detecting the state identifies the combined state, the instruction fetch unit is further configured to set an index which indicates dispatched instructions of the first thread are to be conveyed to the second buffer.

3. The system as recited in claim 1, wherein the scheduler further comprises a third buffer including a third plurality of entries allocated for use by a third thread and the instruction fetch unit is further configured to:
   determine there is no available entry of the third plurality of entries in the third buffer; and
   determine the third thread waits for instruction dispatch due to at least one of the following: the first thread began prior to the third thread, the first thread has a higher associated priority than the third thread, and the first thread is chosen by a round-robin scheme.

4. The system as recited in claim 1, wherein the instruction fetch unit is further configured to: detect a buffer within the scheduler is unavailable when the buffer is in an active state and is full.

5. The system as recited in claim 4, wherein the active state comprises a state wherein a thread is assigned by an operating system to receive instructions.

6. The system as recited in claim 1, wherein the scheduler is configured to:
   mark instructions according to a thread of a given instruction; and
   issue stored instructions from a buffer to the execution unit.

7. The system as recited in claim 6, wherein the scheduler does not mark stored instructions according to a buffer storing the stored instructions.

8. A method comprising:
   allocating a first buffer including a first plurality of entries for use by a first thread, and a second buffer including a second plurality of entries for use by a second thread;
   identifying a state associated with buffers in a scheduler;
   fetching instructions corresponding to a plurality of threads; and
   dispatching the instructions to the scheduler, wherein said dispatching comprises:
      dispatching decoded instructions of the first thread to the first buffer, in response to detecting the state identifies a non-combined state; and
      temporarily dispatching decoded instructions of the first thread to the second buffer as long as the first thread is assigned by an operating system to receive instructions and the state indicates a combined state, wherein the state indicates the combined state responsive to detecting:
         there is no available entry of the first plurality of entries in the first buffer;
         there is an available entry of the second plurality of entries in the second buffer; and
         the second thread is not assigned by an operating system to receive instructions.

9. The method as recited in claim 8, wherein in response to detecting the state identifies the combined state, the instruction fetch unit is further configured to set an index which indicates dispatched instructions of the first thread are to be conveyed to the second buffer.

10. The method as recited in claim 8, further comprising:
    allocating a third buffer including a third plurality of entries for use by a third thread;
    determining there is no available entry of the third plurality of entries in the third buffer; and
    determining the third thread waits for instruction dispatch due to at least one of the following: the first thread began prior to the third thread, the first thread has a higher associated priority than the third thread, and the first thread is chosen by a round-robin scheme.

11. The method as recited in claim 8, further comprising detecting a buffer is unavailable when the buffer is in an active state and is full of dispatched instructions.

12. The method as recited in claim 8, further comprising:
    marking instructions according to a thread of a given instruction; and
    issuing stored instructions from a buffer to the execution unit.

13. The method as recited in claim 11, further comprising the active state comprises a thread is assigned by an operating system to receive instructions.

14. The method as recited in claim 12 further comprising not marking stored instructions according to a buffer storing the stored instructions.

15. A fetch buffer control unit comprising:
    an interface configured to communicate with a first buffer including a first plurality of entries allocated for use by a first thread and a second buffer including a second plurality of entries allocated for use by a second thread, a decoder unit, and a scheduler; and
    circuitry configured to:
       indicate when to dispatch decoded instructions to the scheduler;
       identify a state associated with buffers in the scheduler;
       convey a number of decoded instructions to dispatch to the scheduler;
       provide an index pointing to a buffer within the scheduler; and
       detecting the state identifies a combined state, wherein said detecting comprises:
          there is no available entry of the first plurality of entries in the first buffer;
          there is an available entry of the second plurality of entries in the second buffer; and
          the second thread is not assigned by an operating system to receive instructions;
       temporarily set the index to point to the second buffer as long as the first thread is assigned by an operating system to receive instructions and the state indicates a combined state when notifying to dispatch instructions of the first thread; and
       set the index to point to the first buffer when notifying to dispatch instructions of the first thread, in response detecting the state identifies a non-combined state.

16. The fetch buffer control unit as recited in claim 15, wherein the fetch buffer control unit is further configured to detect a buffer within the scheduler is unavailable when the buffer is in an active state and is full of dispatched instructions.

17. The fetch buffer control unit as recited in claim 16, wherein the active state comprises a state wherein a thread is assigned by an operating system to receive instructions.

* * * * *